2 Sheets—Sheet 1.

F. W. WIESEBROCK.
Effervescent Liquid-Drawing Apparatus.

No. 201,141. Patented March 12, 1878.

Attest:
George Ware
Rudolph F. Eilenberg

Inventor:
Frederick W. Wiesebrock
By Schatz & Salmon
Attys.

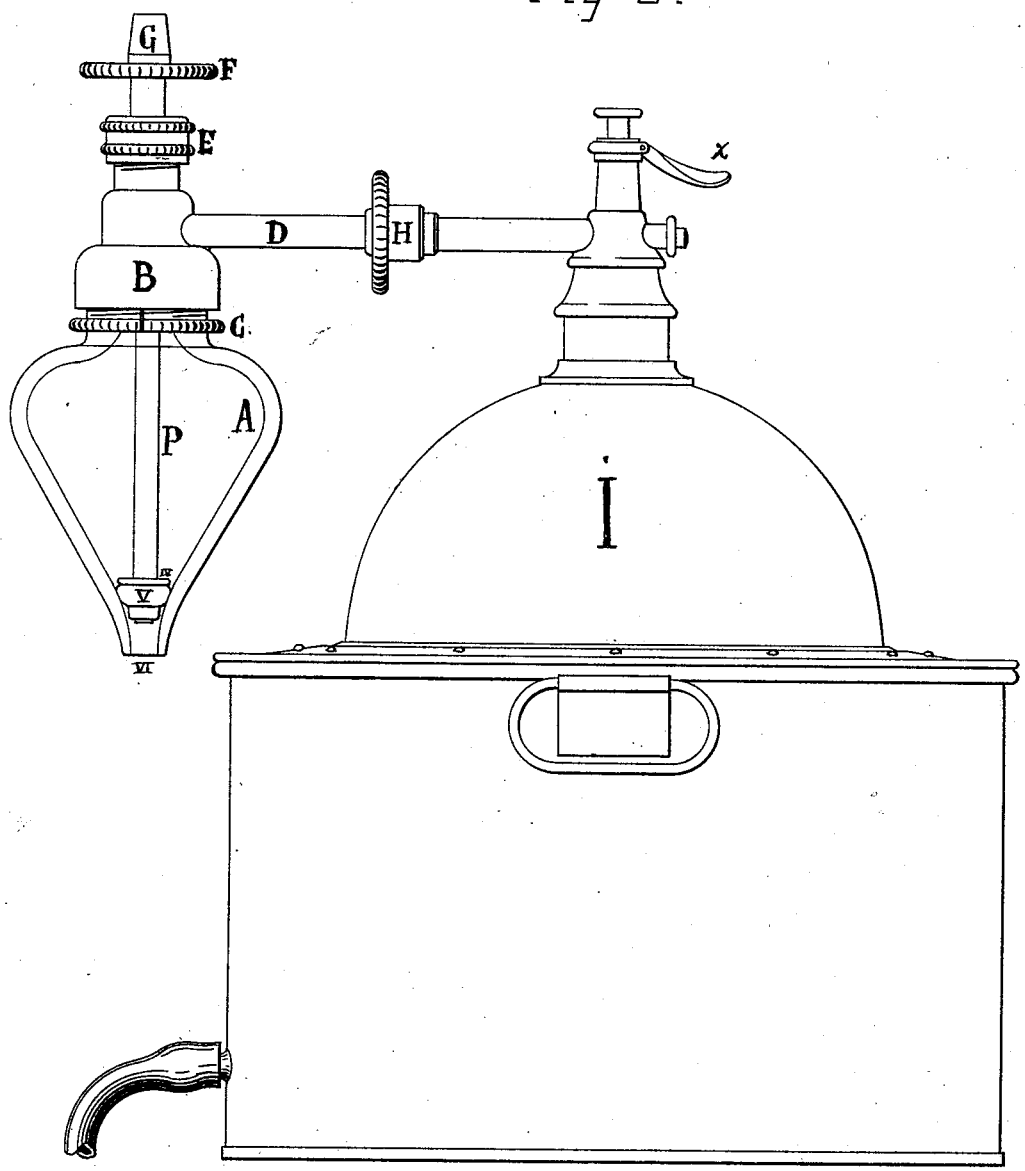

UNITED STATES PATENT OFFICE.

FREDERICK W. WIESEBROCK, OF BROOKLYN, NEW YORK.

IMPROVEMENT IN EFFERVESCENT-LIQUID-DRAWING APPARATUS.

Specification forming part of Letters Patent No. 201,141, dated March 12, 1878; application filed January 28, 1878.

*To all whom it may concern:*

Be it known that I, FREDERICK W. WIESE-BROCK, of the city of Brooklyn, county of Kings, and State of New York, have invented a new and Improved Draft Apparatus for Drafting Champagne Wine and other Effervescent Liquids, which invention is fully set forth in the following specification and the accompanying drawing, in which—

Figure 1:
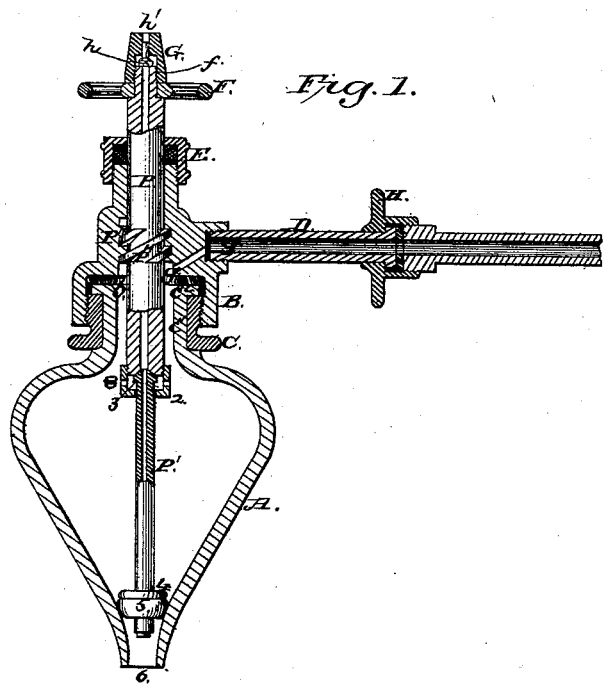
Figure 2:
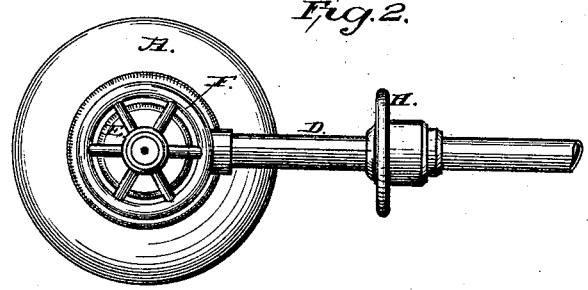

Figure 1 represents a central vertical section. Fig. 2 represents a plan view, and Fig. 3 an elevation, of a complete apparatus.

Similar letters designate corresponding parts.

The object of my invention is to enable the dispensing of aerated liquids by the glass, particularly champagne wine, which heretofore has been drawn from bottles, since no apparatus heretofore invented was of sufficient practical construction to answer the purpose, although many attempts have been made to overcome the difficulties presented. As a rule, the mechanism of the draft apparatus heretofore constructed was so complex that only experts could operate the same, whereas the simplicity of the apparatus herein described by me enables any person to use it, said apparatus always remaining in good order.

Another object sought is to produce a draft apparatus by which American wines will be popularized, for the reason that the same can be dispensed with facility and at a reasonable price.

Having stated the object of my invention, I will now proceed to describe the same.

In Fig. 1, the letter A represents a glass vessel, preferably of a conical shape, the cone being inverted, so as to allow the largest possible surface for the absorption of liberated gas. The said glass vessel A is provided with an opening, 6, at the conic end, and at the other end with a neck, $C^1$, having a collar, $C^2$, by means of which the glass vessel A is attached to the other parts of the apparatus.

The letter C represents a metallic ring cut into two parts, provided with a screw-thread on the outside. The metallic ring C sets around the neck of the glass vessel and under the collar $C^2$, thereby being prevented from slipping the neck of the glass vessel.

Letter B represents a metallic screw-top, provided at the lower end with a screw-thread, which sets over the metallic ring C, and is thereby attached to the glass vessel A. The letter $b$ represents an elastic ring, which is placed between the mouth of the glass vessel A and the metallic top B, for the purpose of forming an air-tight joint. The upper end of the top B is screw-threaded, for the purpose of receiving the stuffing-nut E. The top B is also provided with an inlet-channel, 9', which communicates with the tube D, said tube D being attached to the side of the top B. On the interior the top B is provided with a coarse thread, $P^{III}$, for the purpose of receiving the coarse thread of the hollow spindle P, as will be hereinafter more fully shown.

Letter H of the tube D represents a coupling, by means of which the complete apparatus is attached to the vessel from which the liquid is drawn, as shown in Fig. 3. The letters P and $P^I$ represent a hollow spindle, which consists of two parts, the letter $P^I$ representing the lower and P the upper part thereof. The part P, it will be seen, is provided at both ends, on the outside, with screw-threads, and about the center with a coarse screw-thread, $P^{II}$, calculated to fit in the screw thread $P^{III}$ on the interior of the metallic top B, as above shown, the object of having the same coarse being to facilitate the raising and lowering of the hollow spindle P $P^I$. The tubular opening at the lower end of the spindle part P is valve-shaped, so as to fit the conic-shaped upper end of the part $P^I$, so that the two parts form a valve.

To the upper end of the hollow spindle part P is attached, by means of the screw-thread, the handle F. The handle F is held in place by the air-vent G. The air-vent G is provided with an opening, $h^I$, into which opening the shank of the valve $h$ is fitted.

The lower part of the hollow spindle (designated by the letter $P^I$) is provided at its upper end with a conical-shaped shoulder, 3, made to fit the opening of the upper spindle part P, and thus form a valve. The lower end of the spindle part $P^I$ is provided with a screw-thread for the purpose of receiving the shoulder 4 and the elastic plug or stop 5, which fits, when pressed downward tightly, the inner side of the glass vessel A, for the purpose of preventing the escape of the contents of the glass vessel A through the opening 6. It will be seen that the two spindle parts P and P¹ are connected by means of socket 2, said socket being provided with perforations 8, for the purpose of allowing the escape of gas or the inlet of air, as will be more fully shown hereinafter. The socket is provided with a screw-thread, by means of which it is attached to the upper spindle part P, while the lower spindle part P¹ is suspended by the shoulder 3, by means of which shoulder the lower spindle part P¹ is raised, when desired, by turning the wheel F. The whole spindle is hollow for the purpose of allowing the entrance of air and the escape of the surplus gas, which is unavoidably liberated through the friction caused while flowing through the channels into the glass vessel A.

In Fig. 2, the letter A represents the vessel, letter D represents the tube, and the letter H the coupling, by means of which the complete apparatus is attached to the fountain or vessel from which the liquid is to be drawn. Fig. 3 represents an elevation of the apparatus when the same is connected to the fountain I by means of the coupling H, showing also inlet-valve $x$ of a fountain containing liquid.

In the practical application of my improved draft apparatus I proceed as follows: The hollow spindle part P is screwed down by means of the handle or wheel F and the screw-thread P$^{II}$, thereby pressing or forcing the valve-shaped lower end thereof upon the conical-shaped upper end of the lower spindle part P¹, which, in turn, forces the elastic plug 5 into the opening 6 of the glass vessel A, thereby preventing the escape of any of the contents of the vessel A. When the upper spindle part P is screwed down, as just described, it closes the valve inside of the socket, which valve is formed by the two ends of the spindle parts P P¹ fitting into each other, as shown in the drawing, thereby cutting off all possible escape of gas or inlet of air. When the spindle is in this position, the liquid is allowed to enter the vessel by means of opening the valve usually attached to fountains or vessel calculated to hold aerated beverages. The liquid, through the unavoidable friction it sustains while passing through the channels into the vessel A and the striking the sides of the glass vessel, liberates a large amount of the gas contained in the liquid. When the resistance of the gas and liquid contained in the glass vessel A becomes as great as the force by which the liquid is injected into the glass vessel A, the further inflow of liquid is prevented, and thus the fountain-valve is closed. It is proper here to state that, since the inflow of liberated gas is almost equal to the body of the liquid that passes into the glass vessel A, the vessel A is generally about half filled with liquid.

Having described the process of filling and retaining the liquid in the glass vessel, I will now proceed to describe the manner in which the liquid is dispensed.

It will be seen that when the spindle is screwed downward all the avenues of escape are closed, and no particle of either gas or liquid can escape from the glass vessel. I allow the wine to remain a moment, as it were, hermetically sealed, so that the wine can again absorb the gas liberated by the friction, without which gas the liquid would be almost tasteless. The absorption is facilitated by the fact that the construction of the vessel allows the greatest possible surface of the liquid to be acted upon by the gas. I then screw the part of the spindle P upward by means of the wheel F.

It will be seen that the socket 2 is made large enough, so that it does not raise the lower part of the spindle P¹ at the same time, but only raises the upper spindle P sufficiently to open the valve formed by the two spindle ends. The moment this is accomplished the surplus gas contained in the glass vessel escapes into the hollow in the spindle by way of the perforations 8 contained in the socket 2, and forces the valve $h$ upward and closing it, thus cutting off the escape of the gas through the opening $h^1$, and at the same time preventing the spattering of the operator by the particles of fluid carried out with the escaping gas. The gas, finding its escape at opening $h^1$ cut off, is forced back through the hollow spindle, and escapes at the opening 6 of the vessel A, the liquid particles being caught by the tumbler or glass intended to receive the liquid. The lower spindle part P¹ is raised by means of the shoulder 3. By the raising of the spindle P¹, the plug is drawn from the opening 6, and the liquid allowed to flow out of the vessel A, the outflow being facilitated by means of the inflow of air through the valve $h$ the valve $h$ opening the moment the force of the escaping surplus gas is removed.

What I claim as new, and desire to secure by Letters Patent, is—

1. A champagne-dispensing apparatus having the discharge-valve 5, pressure escape-valve 3, and air-vent $h$, united and worked, substantially as described.

2. In a champagne-dispensing apparatus, the combination of the hollow spindle P and P¹, united by socket 2, said socket being provided with perforations 8, said spindle being provided with elastic plug 5, valve 3, air-vent G, and wheel or handle F, working through stuffing-nut E, the whole being operated by a screw-thread, $P^{II}$, in top B, substantially as herein described, and for the purpose set forth.

3. In a champagne-dispensing apparatus, the combination of the glass vessel A, provided with neck $C^I$, collar $C^{II}$, the metallic ring C, the top B, provided with inlet D, having coupling H, stuffing-nut E, substantially as arranged and described, and for the purpose herein set forth.

Dated New York city, January 16, 1878.

FREDERICK W. WIESEBROCK.

Witnesses:
JACOB H. ALBECK,
RUDOLPH F. EILENBERG.